No. 883,948.
PATENTED APR. 7, 1908.
J. W. GAMBLE.
FEED WATER HEATING AND PURIFYING SYSTEM.
APPLICATION FILED JULY 8, 1907.
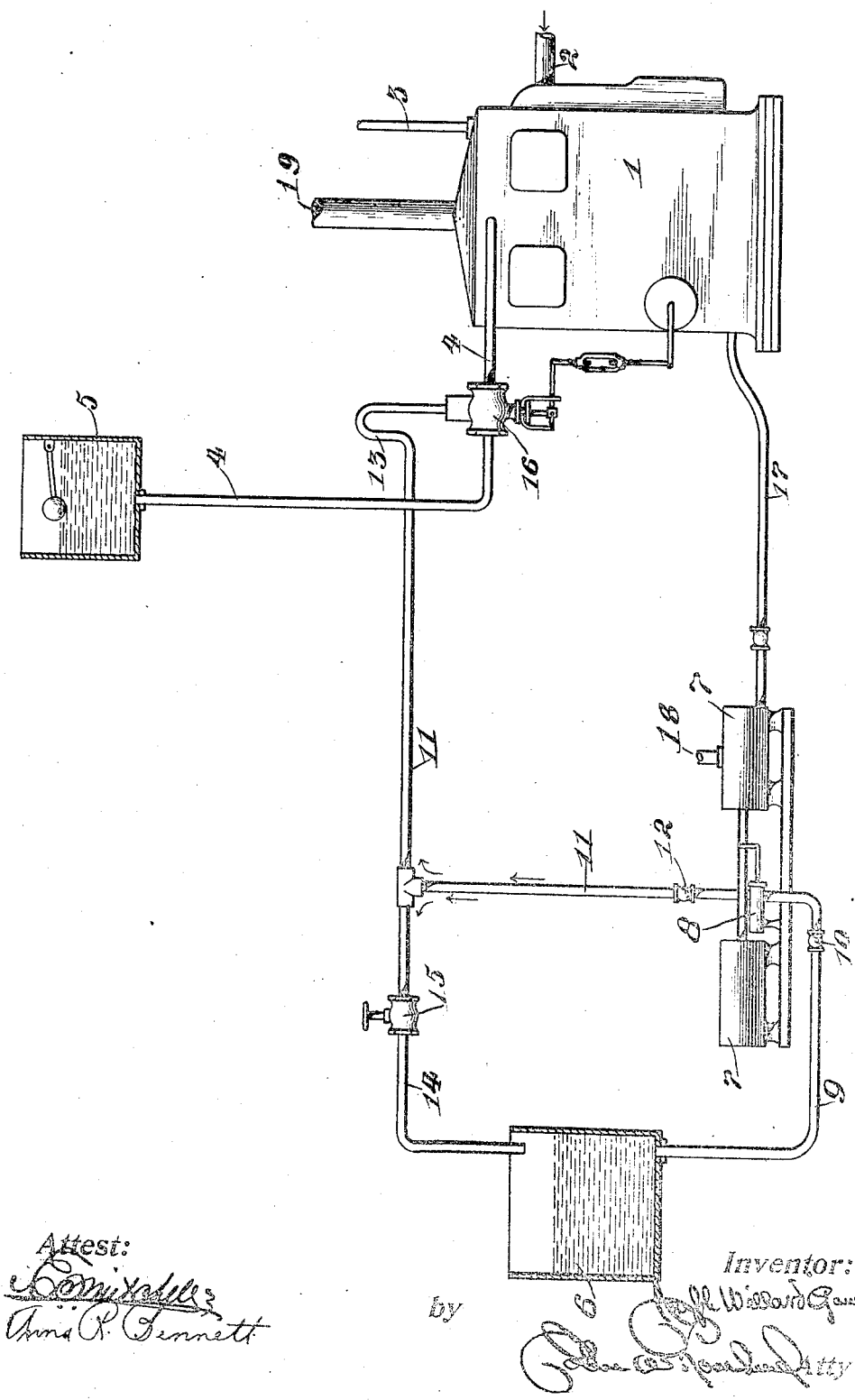
Attest:
Inventor:

UNITED STATES PATENT OFFICE.

JOSEPH WILLARD GAMBLE, OF PHILADELPHIA, PENNSYLVANIA, ASSIGNOR TO JOSEPH S. LOVERING WHARTON, WILLIAM S. HALLOWELL, AND JOHN C. JONES, DOING BUSINESS UNDER THE FIRM-NAME OF HARRISON SAFETY BOILER WORKS, OF PHILADELPHIA, PENNSYLVANIA.

FEED-WATER HEATING AND PURIFYING SYSTEM.

No. 883,945.

Specification of Letters Patent.

Patented April 7, 1908.

Application filed July 2, 1907. Serial No. 282,012.

*To all whom it may concern:*

Be it known that I, JOSEPH WILLARD GAMBLE, a citizen of the United States, and resident of and whose post-office address is No. 2602 North Thirtieth street, Philadelphia, in the county of Philadelphia and State of Pennsylvania, have invented certain new and useful Improvements in Feed-Water Heating and Purifying Systems, of which the following is a specification.

My invention relates to improvements in feed water purifying systems, especially to those employing chemicals for precipitating the impurities in the water, and has particular relation to a method of and means for supplying the chemical in a definite proportion to the amount of raw water supplied. It has a very valuable application in cases where returns from heating systems are brought back in varying quantities to the heater.

The objects of my invention are to provide an efficient, readily and accurately adjustable, convenient and economical system of water purification. I attain these objects in the way and by means of the devices described, illustrated and claimed in the accompanying specification and drawings, in which drawings like numerals of reference refer to like parts throughout.

The figure is a diagrammatic illustration of a system embodying the features of my invention.

1— is a feed water heater; 2— the entrance for exhaust steam; 3— the entrance for "returns" from a heating system, condenser, evaporators, or other source of condensed water; 4— cold or raw water supply; 5— tank or reservoir; 6— chemical supply tank; 7— boiler feed pump; 8— chemical feed pump connected with and operating isochronously with boiler feed pump; 9— pipe connection from chemical supply tank —6— to pump, containing check valve —10—; 11— pipe from chemical pump to heater, containing check valve —12—; 13— seal in chemical supply pipe; 14— pipe returning to chemical supply tank; 15— equalizing or loaded valve in pipe —14—. 16— cold water regulating valve in supply. 17— outlet from heater to boiler feed pump. 18— delivery from pump; 19— exhaust from heater.

In a feed water heating system, it is important that where chemical solution is introduced to precipitate the impurities in the water this solution should be introduced in amounts proportional to the incoming raw water, as otherwise either too much or too little of the chemical will find its way into the heater and an improper and unsatisfactory mixture will result with the consequent disadvantages, and this is particularly true where the amount of raw water varies because of the introduction of partially or completely purified water, as in the case of returns from a heating system, condenser or evaporators, the supplies from which constantly vary in amount, thereby requiring a variable increment of raw water to make up the total amount necessary for the boilers, which must pass through the heater.

It is advisable—and I preferably so arrange it—to operate my chemical feed pump simultaneously with the boiler feed pump so that the desired proportional quantity of chemical solution having once been determined the operation of the feed water pump will normally and continuously supply the proper amount of chemical to the raw water; that is, the chemical is fed in a positive manner and in definite proportions to the normal supply of raw water, and the supply is capable, of course, of manual regulation; but as the feed water pump takes out only the treated water, it is important that there should be automatic means for controlling the supply of chemical solution in addition to the proportional amount supplied by the chemical pump itself, since, as has been pointed out, the variation in the proportion of the pure returns to the raw increment will directly affect the proportion of chemical supply to the raw water unless some supplementary way were devised by which any excess of chemical could be prevented; for instance, it is conceivable that under certain circumstances the pure returns to the heater might almost be enough to supply the boilers, in which case, unless it were prevented, there would be an excess of chemical solution forced into the heater because the supply of raw water is reduced to a minimum. In order to accomplish the objects, therefore, of my invention I prefer to place a reservoir or tank —5— for the raw water at such a point above the heater that it will give a constant head through the pipe —4—, and this supply of raw water is regulated according to the needs of the heater by the well known method of float regulation operating the valve —16—. I connect my chemical solution pump —8— with the boiler feed pump —7— so that they shall operate simultaneously. I place the chemical solution tank —6— preferably below the raw water inlet to the heater so that it cannot feed by gravity. The pipe —9— connected with the chemical solution pump —8— takes the chemical solution, which is prevented from returning to the tank by the check valve —10— and forces it through the pipe —11— into the cold water supply and preferably through the combined chemical and raw water regulating valve —16—. If, now, because the returns through the pipe —3— are nearly sufficient to meet the needs of the boilers, the regulating valve —16— is kept closed or nearly so, the excess of chemical solution which is being constantly pumped must be returned to the chemical solution tank. I, therefore, provide the pipe —14— connecting with —11—, and place in said pipe —14— the adjustable back pressure valve —15—, the operation of which is as follows: When the pressure of the chemical solution in the pipe —11— rises beyond the normal because of the closing of the valve —16—, the valve —15—,—which is normally closed,— is opened and the chemical solution passes through the pipe —14— back into the chemical tank —6—, and so continues until the valve —16— is opened, when the valve —15— closes and the normal operation is again resumed. Thus the chemical solution is fed proportionally to the amount of raw water entering the heater and not in proportion to the amount of treated water being taken from the same.

Where I have used the words "back pressure valve" I mean any valve to open upon the increase of pressure beyond a predetermined point. This valve may be spring or weight, or otherwise loaded, and may be adjustable for pressure. Where I use the words "pure water supply" I mean by this, any source or supply of pure or comparatively pure water such as, for instance, is returned from a heating system, condenser plant, evaporators, or other source, generally condensed steam.

It will be evident that I do not limit myself to any particular form of heater, or arrangement, or style of pump, nor the precise arrangement nor location as illustrated in the drawing, as this may be somewhat varied without departing from the spirit of my invention.

What I claim and desire to protect by Letters Patent is:

1. In a feed water heating system, the combination of a feed water heater; a chemical solution supply; an automatically regulated raw water supply; a chemical solution pump discharging into the raw water supply; a by-pass between the chemical pump and the chemical supply and a back pressure valve located in said by-pass.

2. In a feed water heating system, the combination of a feed water heater; a chemical solution supply placed below the raw water inlet to the heater; a raw water supply, and means for regulating the same according to the water level in the heater; a boiler feed pump; a chemical solution pump operating simultaneously with the boiler feed pump and discharging into the raw water supply; a by-pass between the chemical pump and the chemical supply; and a back pressure valve located in said by-pass.

3. The combination of a feed water heater; a raw water supply, and means for regulating it according to the water level in the heater; a chemical solution supply placed below the raw water inlet of the heater; a pure water supply; means for removing the heated water; means operating simultaneously therewith for supplying the chemical solution to the raw water in quantity proportional to the raw water normally supplied; and means for automatically returning any excess of chemical solution to the supply.

4. The combination of a feed water heater; an automatically regulated raw water supply; a pure water supply; a chemical supply; means for introducing into the raw water a quantity of chemical proportional to the quantity of raw water normally supplied to the heater, said raw water and chemical supplies varying inversely to said pure water supply, and means for automatically diverting any excess of chemical back to the supply.

5. The combination of a feed water heater; a raw water supply; means for regulating the admission of raw water according to the water level in the heater; a pure water supply; a chemical supply; means for removing the heated water from the heater; means operating simultaneously therewith for supplying the chemical solution to the raw water in quantity proportional to the raw water normally supplied to the heater; means for automatically returning any excess of chemical solution to the supply.

6. In a feed water heating system, the combination of a feed water heater having a pure water supply and an exhaust steam supply; a chemical solution supply; a raw water supply; a common inlet for said raw water and chemical supplies, and means operated by the water level within the heater to simultaneously admit to said heater through said common inlet a proportional admixture of both the raw water and chemical supply.

7. In a purifying system, the combination of a vessel; a chemical supply; a raw water supply; a pure water supply; and means for automatically varying the admission of the raw water and chemical inversely to the pure water supply, substantially as described.

8. In a purifying system, the combination of a vessel; a chemical supply; a raw water supply; a pure water supply; means operated within the vessel for varying the admission of the raw and chemical inversely to the pure water supply, substantially as described.

9. In a purifying system, the combination of a vessel; a chemical supply; a raw water supply; a pure water supply; float actuated mechanism for automatically governing the admission of the raw water and chemical so that they vary inversely to the pure water supply, substantially as described.

10. In a purifying system, the combination of a vessel; an outlet therefrom; a raw water supply; a chemical supply, and a pure water supply; and means for automatically varying the chemical and raw water supplies, so that they are dependent upon and vary inversely as the withdrawal of the treated water from the vessel through said outlet, substantially as described.

11. In a purifying system, the combination of a vessel; an outlet therefrom; a raw water supply; a pure water supply, a chemical supply; means within the tank operating to vary the chemical and raw water supplies so that they are dependent upon and vary inversely as the withdrawal of the treated water from the tank through said outlet, substantially as described.

12. In a purifying system, the combination of a vessel; a raw water supply; a chemical supply; and a pure water supply; float actuated mechanism for automatically varying the chemical and raw water supplies, dependent upon the quantity of the pure water supply, substantially as described.

13. In a purifying system, the combination of a vessel; an outlet therefrom; a raw water supply; a chemical supply and a pure water supply; and means for automatically varying the chemical and raw water supplies, dependent upon the water line maintained in the vessel, substantially as described.

14. In a purifying system, the combination of a vessel; an outlet therefrom; a raw water supply; a chemical supply; a pure water supply and float actuated mechanism for automatically varying the chemical and raw water supplies, dependent upon the water line maintained in the vessel, substantially as described.

15. The combination of a feed water heater having a pure water supply and a steam supply; a chemical supply; a raw water supply; means operated by the water level within the heater to simultaneously admit to said heater a proportional admixture of both raw and chemical supplies, said proportional admixture varying inversely as the pure water supply, substantially as described.

16. In a purifying system, the combination of a vessel; a raw water supply; a chemical supply; and a pure water supply; means for automatically varying the chemical and raw water supplies, dependent upon the quantity of the pure water supply, substantially as described.

17. In a purifying system, the combination of a vessel; a raw water supply; a chemical supply; and a pure water supply; float actuated mechanism for automatically varying the chemical and raw water supplies, dependent upon the quantity of the pure water supply in the vessel, substantially as described.

Signed at Philadelphia in the county of Philadelphia and State of Pennsylvania this 18th day of May, 1907.

JOSEPH WILLARD GAMBLE.

Witnesses:
JOSEPH M. HEWLETT
D. J. HUNTER, Jr.